United States Patent [19]
Martin

[11] 3,814,225
[45] June 4, 1974

[54] PISTON ASSEMBLY FOR POWER TRANSMISSION
[75] Inventor: James R. Martin, Ypsilanti, Mich.
[73] Assignee: General Motors Corporation, Detroit, Mich.
[22] Filed: Mar. 2, 1973
[21] Appl. No.: 337,627

[52] U.S. Cl. .............. 192/85 AA, 92/107, 92/249, 188/366
[51] Int. Cl. ............................................ F16d 25/00
[58] Field of Search ............ 92/107, 108, 249, 253; 188/366; 192/85 AA, 85 R

[56] References Cited
UNITED STATES PATENTS
2,932,280  4/1960  Vielmo ........................... 92/249 X
3,321,056  5/1967  Winchell et al. .................. 192/85 R Primary Examiner—Benjamin W. Wyche
Attorney, Agent, or Firm—Charles R. White

[57] ABSTRACT

This piston assembly incorporates an annular shell stamped from sheet metal which has inner and outer rims connected by an intermediate channeled portion. Inner and outer annular lip seals with integral retainer portions are molded from elastomeric material directly on the shell adjacent to the rims to eliminate special seal retainer grooves or the bonding of the seals to the shell. The outer rim has an axially extending contact face for engaging a friction device and radially extending stop means to limit movement of the piston into the piston bore.

5 Claims, 4 Drawing Figures

PATENTED JUN 4 1974 3,814,225

PISTON ASSEMBLY FOR POWER TRANSMISSION

This invention relates to hydraulically operated piston assemblies for transmissions and more particularly to new and improved piston construction having elastomeric lip seal means with integral retainer portions to secure the lip seal to the piston body.

Many current transmissions incorporate clutch and brake apply pistons which are machined from rough castings to close tolerances on most of their surfaces to insure proper fit and proper operation in the transmission. To reduce cost and weight, pistons stamped from sheet metal have been utilized in some transmission designs. While these sheet metal pistons have provided many important benefits, often several stampings were required to make the annular retainer groove for lip seals needed on such assemblies. Generally, such pistons are fairly complex in construction requiring special shoulders and seal retaining members which add to their cost and their complexity. Pistons having lip seals bonded on the rims require special cleaning and preparation of the mounting shoulders and have a relatively short service life.

This invention provides a new and improved stamped sheet metal piston with inner and outer annular rims through which a series of axial holes are formed. Preferably, the lip seals are injection molded from a heat stabilized polyester elastomer or other suitable elastomeric materials directly onto the shell with the annular sealing lips formed on one side of the shell connected to retainer portions formed on the other side by the elastomeric material which flows through the openings. Each of the lip seals has an annular contact lip which extends radially beyond the limits of the stamped shell of the piston to provide good sealing contact with the walls of the piston bore.

In one embodiment a portion of the outer rim of the shell is curled in an axial direction to form an annular contact for engaging a multi-plate clutch or brake. A portion of this contact is bent radially outward to engage a portion of the piston housing to limit axial movement of the piston into the piston bore.

It is a feature, object and advantage of this invention to provide a new and improved piston assembly for a friction drive establishing device of a transmission in which a lip seal is molded directly on the main body of the piston and is retained thereon by having the elastomeric material flow through spaced openings in the piston body to the inside of the piston body where enlarged retainer portions are formed.

It is another feature, object and advantage of this invention to provide a new and improved piston assembly incorporating an annular shell having inner and outer rims connected by an intermediate channel portion with inner and outer elastomeric lip seals with integral retainer portions extending through openings in the shell to provide improved retention of the seals on the shell.

Another feature, object and advantage of this invention is to provide a new and improved piston assembly for a transmission incorporating an annular shell stamped from sheet metal having inner and outer rims with each of the rims having a series of openings extending axially therethrough and further incorporating elastomeric lip seal means molded on the shell having annular contact lips disposed on one side of the shell joined by elastomeric material extending through the openings to a retainer portion formed on the other side of the shell.

These and other features, objects and advantages of this invention will become more apparent from the following detailed description and drawings in which.

Figures 1, 2, 3, 4:
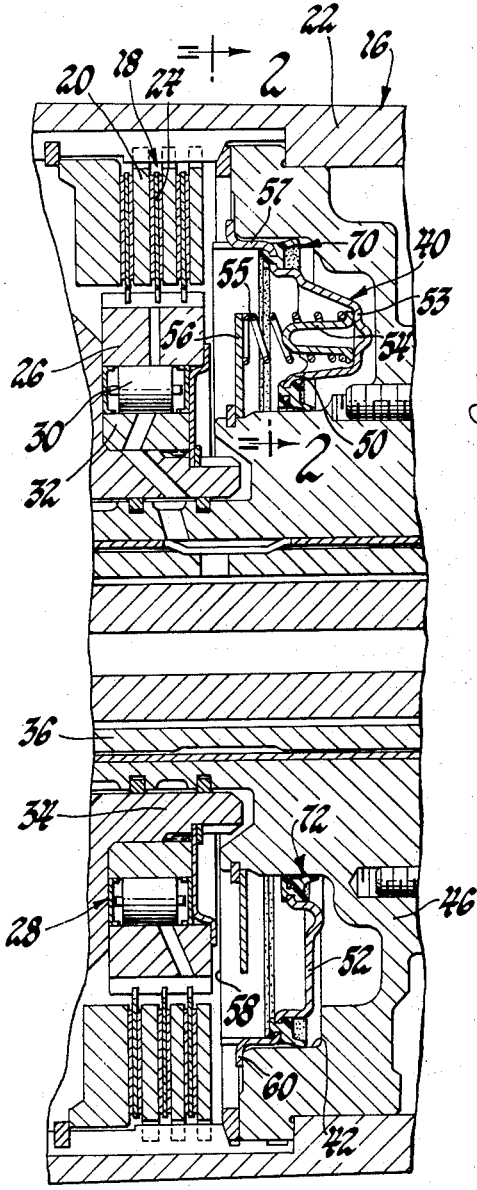
FIG. 1 is a side sectional view of an upper portion of a multi-plate friction brake of a transmission.
FIG. 2 is a view taken generally along lines 2—2 of FIG. 1 with parts broken away and some parts removed.
FIG. 3 is an enlarged side sectional view of an outer part of the stamped piston construction of FIG. 1.
FIG. 4 is an enlarged side sectional view of an inner portion of the stamped piston construction of FIG. 1.

Turning now to FIG. 1, there is illustrated a portion of a transmission 16 which in its entirety may be the same as the transmission disclosed in my co-pending application Ser. No. 288,905, filed Sept. 14, 1972, and titled "Sheet Metal Piston for Transmissions and Method of Making a Piston Assembly" and in the patent to Winchell, et al., U.S. Pat. No. 3,321,056 issued May 23, 1967. Transmission 16 includes a multi-plate intermediate brake 18 which has annular steel plates 20 splined to the inside of the transmission case 22 interleaved with plates 24 faced with friction material which are splined to the outer race 26 of a one-way brake 28. The one-way brake has conventional rollers 30 interposed between the outer race 26 and an annular inner race 32 that is splined to a rotatable drum 34. Drum 34 is drivingly connected to a sleeve shaft 36 which extends axially in the transmission. Sleeve shaft 36 is drivingly connected to a planetary gear unit, not shown, so that the gear unit can be conditioned for a predetermined drive ratio when brake 18 and the one-way brake are engaged as described in the Winchell et al. patent referenced above.

The multi-plate friction brake 18 is selectively engaged by a hydraulically actuated piston assembly 40 mounted for axial movement in an annular bore 42 formed in a center support 46. This piston assembly comprises an annular piston body or shell stamped from sheet metal stock and is formed with outer and inner annular rims 48 and 50 connected by an intermediate channel portion 52 to slidably fit in the bore. The channel portion is formed with depressed spaced pockets 53 in which are mounted spring retainers 54 that hold helical piston return springs 55 therein. These return springs are seated on a base plate 56 fixed to support 46 and move the piston assembly to an off or disengaged position from brake 18 when apply pressure is exhausted from the apply chamber formed between the piston assembly and bore 42. The outer rim of the piston assembly 40 has an axially extending annular contact portion 57 terminating in an end face 58 for engaging the multiple disc brake 18. Struck radially upward from the contact portion 57 are stops 60, suitably spaced around the outer periphery of the shell, to engage a stop shoulder on the face of the center support to limit the axial movement of the piston assembly 40 into the bore.

As shown in FIGS. 1 and 2, the outer and inner rims 48 and 50 are each provided with a series of axially extending openings 62 and 64 arranged in a circle. The outside of the intermediate channel portion 52 adjacent to the rims forms annular support shoulders 66 and 68, respectively, which provide support for the injection molded polyester elastomer lip seals 70 and 72.

As shown best by FIG. 3, the lip seal 70 has a ring-like major body portion 76 which is disposed adjacent to the outer rim 48 and has an outwardly flaring sealing lip 78 that engages the interior of the outer wall of the bore to provide for the fluid sealing of the piston in the bore. The lip seal 70 is secured to the shell by an annular retainer portion 82 integral with the body portion which is formed on the inside of the shell adjacent to the outer rim 50. The retainer portion is joined with the body portion by connector portions 83 which extend through the openings 62.

The inner lip seal 72 is similar to lip seal 70 and is formed with a ring-like body portion 84 from which an inwardly extending sealing lip 88 extends. This lip contacts the inner wall of the bore to provide for fluid sealing between the inner rim and the bore. The lip seal 72 is secured to the shell by an integral retainer portion 92 that extends through the openings 64. In the preferred embodiment the inner lip seal has an inner portion which extends around the inner diameter of the inner rim 50 as shown best in FIG. 4.

The two lip seals are preferably formed directly on each of the shells by injection molding. During the molding process the elastomer material flows through the holes 62 and 64 into the interior of the shell so that the molded retainer portions are formed to thereby secure the lip seals to the shell.

With the construction described above the lip seals are firmly secured to the stamped piston without the use of adhesives, annular retainer grooves or other mechanical fasteners. The lips seals can be readily injection molded onto the stamped shell with minimized special preparation of the shell. The gripping action afforded by the retainer portion of the seal provides for improved service life and improved sealing as compared to bonded and mechanically retained seals.

While the preferred embodiments of this invention have been shown and described to illustrate the invention, various changes and modifications may be made without departing from the scope of the invention as set forth in the following claims:

I claim:

1. In a power transmission, a friction drive-establishing device for controlling the flow of power through said transmission, a hydraulically operated piston assembly for selectively engaging said friction device, a piston housing, said piston housing having a bore therein for receiving said piston assembly, said housing having a stop portion adjacent to said bore, said piston assembly having an annular shell with inner and outer rims, said outer rim having a plurality of spaced openings extending axially therethrough, lip seal means of homogenous elastomeric material for said piston assembly, said lip seal means comprising a main body portion disposed on the outside of said shell, an annular fluid sealing lip integral with said main body portion that extends beyond the circumference of said shell into sealing engagement with an outer wall of said bore, a retaining portion disposed on the inside of said shell, and connecting means extending through said openings to join said retaining portion and said main body portion to thereby secure said lip seal means to said shell; said outer rim having an annular axially extending contact portion for engagement with said friction device when said piston assembly is actuated, spring means for moving said piston assembly from engagement with said friction device, and radially extending stop means projecting outwardly from said contact portion to engage said stop portion of said housing to limit the movement of said piston assembly into said bore.

2. In a hydraulically operated piston assembly for a power transmission friction drive establishing device; a thin walled annular shell having concentric inner and outer annular rims to slidably fit within a supporting bore in the transmission and an intermediate channel portion which interconnects said inner and outer rims; at least one of said rims having a plurality of spaced openings extending axially therethrough; lip seal means of homogenous elastomeric material for said piston comprising a main body portion disposed on the outside of said shell, an annular fluid sealing lip integral with said main body portion that extends beyond the radial limits of said shell for sealing engagement with a wall of said bore, a retaining portion disposed on the inside of said shell, and connecting means extending through said openings to join said retaining portion and said main body portion to secure said lip seal means to said shell.

3. In a hydraulically operated piston assembly for a friction drive establishing device of a transmission; a thin walled annular shell having concentric inner and outer annular rims to slidably fit within a supporting bore for said piston assembly in the transmission; said shell having an intermediate channel portion which interconnects said inner and outer rims; one of said rims having a plurality of spaced openings extending axially therethrough; unitary annular elastomeric fluid sealing means for said shell comprising a main body portion disposed on the outside of said shell adjacent to said one rim, an annular contact lip which extends from said body portion beyond the periphery of said shell for fluid sealing engagement with a wall of said bore, a retaining portion disposed on the inside of said shell adjacent to said first rim and connecting portions that extend through said openings to join said retainer portion and said body portion; and fluid sealing means for the other of said rims to provide a seal between said other rim and another wall of said bore.

4. A hydraulically operated piston assembly for a friction device of a transmission comprising a stamped metal shell having concentric inner and outer rims mounted for axial sliding movement within a supporting bore in said transmission, said shell having an annular intermediate portion connecting said inner and outer rims, each of said rims having a plurality of spaced openings extending axially therethrough, a one-piece elastomeric lip seal for each of said rims, each of said lip seals having an annular main body portion disposed on the outside of said shell adjacent to the associated rim and having an annular lip that projects beyond the radial limit of said associated rim for sealing contact with a wall of the bore, each of said lip seals further having a retaining portion disposed on the other side of said shell and interconnecting rim portions which extend through said openings to join said main body portion and said retaining portion and thereby secure said lip seals on said shell.

5. A hydraulically operated piston assembly for a friction device of a transmission comprising a stamped metal shell having concentric inner and outer rims mounted for axial sliding movement within a supporting bore in said transmission for said piston assembly, said shell having an annular intermediate portion connecting said inner and outer rims, each of said rims having a plurality of spaced openings extending axially therethrough, an outer lip seal of elastomer material for said shell comprising, an annular sealing lip mounted on the outside of said shell adjacent to said outer rim that projects beyond the outer circumference of said shell for fluid sealing engagement with a wall of the bore and further incorporating a retaining portion disposed on the side of said shell and connecting portions extending through said openings to join said seal lip and said retaining portion, and an inner lip seal means of elastomer material for said shell which extends completely around said inner rim and which is connected by connector portions extending through said openings in said inner rim.

* * * * *

PO-1050
(5/69)

UNITED STATES PATENT OFFICE
CERTIFICATE OF CORRECTION

Patent No. 3,814,225        Dated June 4, 1974

Inventor(s) James R. Martin

It is certified that error appears in the above-identified patent and that said Letters Patent are hereby corrected as shown below:

Column 6, line 2, "side" should be -- inside --.

Column 3, lines 32 and 33, "machanical" should be

-- mechanical --.

Signed and sealed this 18th day of February 1975.

(SEAL)
Attest:

RUTH C. MASON
Attesting Officer

C. MARSHALL DANN
Commissioner of Patents
and Trademarks